(12) United States Patent
Tierney

(10) Patent No.: US 9,251,550 B2
(45) Date of Patent: Feb. 2, 2016

(54) SECURITY DEVICES INCORPORATING COLOUR SHIFTING INKS

(75) Inventor: Christopher Peter Tierney, Ferntree Gully (AU)

(73) Assignee: INNOVIA SECURITY PTY LTD, Victoria (AU)

( * ) Notice: Subject to any disclaimer, the term of this patent is extended or adjusted under 35 U.S.C. 154(b) by 93 days.

(21) Appl. No.: 14/128,928

(22) PCT Filed: Jun. 25, 2012

(86) PCT No.: PCT/AU2012/000743
§ 371 (c)(1),
(2), (4) Date: Jan. 28, 2014

(87) PCT Pub. No.: WO2013/000012
PCT Pub. Date: Jan. 3, 2013

(65) Prior Publication Data
US 2014/0126765 A1 May 8, 2014

(30) Foreign Application Priority Data

Jun. 29, 2011 (AU) ................................ 2011100778

(51) Int. Cl.
| G06T 1/00 | (2006.01) |
| B42D 25/351 | (2014.01) |
| B42D 25/378 | (2014.01) |
| B42D 15/00 | (2006.01) |
| B41M 3/14 | (2006.01) |

(52) U.S. Cl.
CPC .................. *G06T 1/005* (2013.01); *B41M 3/14* (2013.01); *B42D 15/00* (2013.01); *B42D 25/351* (2014.10); *B42D 25/378* (2014.10)

(58) Field of Classification Search
CPC ............................ B42D 25/351; B42D 25/378
USPC ......................................................... 283/114
See application file for complete search history.

(56) References Cited

U.S. PATENT DOCUMENTS

| 6,114,018 A | * | 9/2000 | Phillips et al. ................. 428/200 |
| 2007/0273147 A1 | * | 11/2007 | Phillips et al. .................. 283/94 |

FOREIGN PATENT DOCUMENTS

WO       WO 2006/133512          12/2006

OTHER PUBLICATIONS

Search Report Issued in Int'l Application No. PCT/AU2012/000743 (2012).
International Preliminary Report on Patentability issued in Int'l App. No. PCT/AU2012/000743 (2013).

* cited by examiner

*Primary Examiner* — Kyle Grabowski
(74) *Attorney, Agent, or Firm* — Barnes & Thornburg LLP

(57) ABSTRACT

A security document or device is provided which includes at least one area formed from a transparent plastics material which is exposed on at least one side to form a window or half-window, and a first color shifting ink composition and a second color shifting ink composition which both include different color pigments and interference pigments but which both, at a first viewing angle, exhibit substantially the same color when the interference pigments are viewable, and at other angles exhibit different colors when viewing the color pigments.

9 Claims, 3 Drawing Sheets

SECURITY DEVICES INCORPORATING COLOUR SHIFTING INKS

CROSS REFERENCE TO RELATED APPLICATIONS

This patent application is a U.S. nationalization under 35 U.S.C. §371 of International Application No. PCT/AU2012/000743, filed Jun. 25, 2012, which claims priority to Australian Patent Application No. 2011100778, filed Jun. 29, 2011. The disclosures set forth in the referenced applications are incorporated herein by reference in their entireties.

FIELD OF THE INVENTION

This invention relates to security devices and security documents or tokens, such as banknotes or the like, and is particularly concerned with providing a security device or document with an overt optically variable security device that is readily discernible but which is difficult to copy or counterfeit.

BACKGROUND TO THE INVENTION

A security document including a sheet like substrate having a transparent area or "window" formed from a portion of transparent plastics material has previously been proposed. The window formed in the security document is particularly suited for incorporating a security device such as an embossed image or an optically variable device, such as a diffraction grating or hologram.

Security devices are required to attest to the authenticity of the security document. The devices are required to prevent counterfeiting of security documents and in the case of overt security devices, should be easily and quickly identifiable on the document. A further requirement for security documents is that they are cost effective to produce and are durable enough to withstand everyday use, such as the use encountered by banknotes.

WO 2006/133512 discloses a security document or device having colour shifting inks. An ink is provided which provides at least one at least one colour shift between a first colour and a second distinct colour depending upon the viewing angle.

SUMMARY OF THE INVENTION

According to one aspect of the invention, there is provided a security document or device including at least one area formed from a transparent plastics material which is exposed on at least one side to form a window or half-window, and a first colour shifting ink composition including a first interference pigment and a first colour pigment and a second colour shifting ink composition including a second interference pigment and a second colour pigment, applied in at least part of the window or half-window, wherein the first colour shifting ink composition provides at a first viewing angle a first colour, when the first interference pigment is viewable and the second colour shifting ink composition provides at the first viewing angle substantially the same first colour when the second interference pigment is viewable, wherein at a second viewing angle, different from the first viewing angle, the first colour shifting ink composition provides a second colour from the first colour pigment and the second colour shifting ink composition provides a third colour from the second colour pigment, different from the first and second colour.

"Colour" as referred to herein, as specifically that one colour is different from another relates to the various properties of hue, chromacity, saturation, brightness, tints, tones or shades of colour that are perceptible by human, or even electronic vision. Where a colour is substantially similar to another colour, the viewing party or object views the colour as the same or close to the other colour.

Advantageously, the present invention provides a security document or device which provides an overt feature which is capable of providing interesting colour shifting effects through the printing of the colour shifting inks such that, at the first viewing angle, one design is viewable but at the second viewing angle, or substantially all other angles, a second design is viewable. Particularly, that at the first viewing angle, which corresponds to an angle at which the interference pigments of the first and second colour shifting ink compositions are viewable, the first and second colour shifting ink compositions provide colours which are metamers, that is are substantially the same colour, and exhibit geometric metamerism, in that, at other angles, the inks provide different colours.

The first and second colour shifting ink compositions are also chosen such that, at the second viewing angle, or substantially all other angles, different colours are viewable for each colour shifting ink composition.

In a further embodiment, a third colour shifting ink composition having a third interference pigment which provides a fourth colour at the first viewing angle, different to the first colour provided by the first and second colour shifting ink composition, and a colour pigment which provides the second or third colour at the second viewing angle, as provided by the first or second colour shifting ink composition.

Preferably, the colour shifting ink compositions includes a major proportion of an optically variable pearlescent interference pigment, such as KW Pearl Pigments produced by Kunwei Pearl Pigment Co. Ltd, and a minor proportion of a colour pigment, which may be organic or inorganic. The interference pigment and particles of the colour pigment may be mixed with a transparent binder or resin to form the colour shifting ink compositions which is suitable for application to a substrate in a printing process.

The colour shifting ink is preferably formed from a formulation including from about 10% to about 30% of a pearl lustre interference pigment (for example, interference pigments produced by the Kunwei Pearl Pigment Co. Ltd), from about 0.5% to about 10% of an organic or inorganic colour pigment, eg phtalocynanine blue, and from about 60% to 90% of transparent binder or resin. Preferably, the pearl lustre interference pigments have a particle size from about 1 μm (microns) to about 200 μm (microns) and, more preferably, from about 5 μm to about 60 μm. This forms a colour shifting ink composition which has a transparent colour at most angles generally taken from the colour pigment and an interference colour at certain angles which is a derived from the colour pigment and the interference pigment.

When "colour pigment" is used herein, this is a reference to an organic or inorganic colour pigments and mixtures and when "interference pigment" is used herein, this is a reference to interference pigments in general, one example of which is a pearl lustre interference pigment.

In one embodiment, the security document or device comprises a transparent plastics substrate, and at least one opacifying coating applied to a surface on at least one side of the substrate in such a manner as to leave a region of the substrate uncovered to form the window or half-window.

The window may be a full window region which is not covered by the at least one opacifying coating on both sides of the substrate in the full window region. In this case, an image formed by the colour shifting ink compositions in the full window may be translucent and is visible in transmission from both sides of the security document or device.

Alternatively, the colour shifting ink compositions may be at least partly applied in a half-window region which is completely covered by at least one opacifying coating on one side of the substrate, but which is not covered by an opacifying coating on the opposite side of the substrate. An image formed by the colour shifting ink compositions in the half-window region may be translucent and visible in transmission from both sides of the security document or device.

In one embodiment, the colour shifting ink compositions are applied to a surface on one side of the transparent substrate and is at least partly covered by an opacifying coating on that side of the substrate with an area of the opposite side of the substrate being uncovered by the opacifying coating so as to form a half-window through which the colour shifting ink composition is visible from the uncovered side.

An advantage of this embodiment is that the opacifying coating applied over the colour shifting inks assists in providing a more durable security feature.

In a particularly preferred embodiment, the security document is a flexible security document and may include self-verifying means for verifying the security document. The self verifying means may include a substantially plain area (ie having only one colour, eg white or black) such that when the security document is bent or folded, the window is brought into register with the substantially plain area such that the colour shifting effects can be viewed against the plain coloured background. The document may also include two or more different coloured substantially plain areas at different locations so that different effects are viewed when the window is bought into register with the different coloured plain areas. For example, one of the plain areas may be a light colour, such as white or yellow, and the other substantially plain area may be a dark colour, such as black or dark blue.

According to another aspect of the invention, there is provided a method of producing a security document or device which includes the steps of:

providing a sheet-like substrate of transparent plastics material having first and second surfaces on opposite sides of the substrate;

applying at least one opacifying coating on said first surface of the substrate in such a manner as to leave a region of the substrate uncovered to form a window;

applying a first colour shifting ink composition including a first colour pigment and a first interference pigment in at least part of the window region of the substrate; and applying a second colour shifting ink composition including a second colour pigment and a second interference pigment in at least part of the window region of the substrate, wherein, the first colour shifting ink composition provides, at a first viewing angle, a first colour when the first interference pigment is viewable and the second colour shifting ink composition provides, at the first viewing angle, substantially the same first colour when the second interference pigment is viewable, wherein at a second viewing angle, different from the first viewing angle, the first colour shifting ink composition provides a second colour from the first colour pigment and the second colour shifting ink composition provides a third colour from the second colour pigment, different from the first and second colour.

The method may also include the step of applying an opacifying layer of ink on said second surface of the substrate in such a manner as to leave a region of the substrate uncovered which is in register with the window formed on the first surface of the substrate to form a full window in which the colour shifting ink compositions have been applied.

An alternative method may include the step of applying at least one opacifying coating on said second surface in at least part of the window region to form a half-window which is uncovered by opacifying coating on the first surface on one side of the substrate and covered by opacifying coating on the second surface on the opposite side of the substrate, the colour shifting ink compositions being at least partly applied in the half-window region.

The colour shifting ink compositions may be applied either before or after the step or steps of applying the at least one opacifying coating to form the full window or half-window. However, when forming a half-window, the colour shifting ink compositions are applied to the second surface of the substrate before the opacifying coating is applied to the second surface to cover the colour shifting ink compositions on the second surface.

The colour shifting ink compositions may be applied to at least one of the surfaces of the substrate to overlap the window or half-window region and a surrounding or adjacent opaque area formed by the opacifying coating or coatings.

The method above may be used to produce a self-verifying security document or device when the sheet-like substrate is formed from a flexible plastics material. In this case the method may further include the step of applying at least one substantially plain opaque ink or coating to at least one surface of the substrate at a location spaced laterally from the window region to form a self-verifying means which enables the colour shifting effects of the at least one colour shifting ink composition to be observed in reflection when the flexible sheet is bent, folded or twisted to bring the window into register with the substantially plain opaque ink or coating.

A security document or device and method of producing a security document or device can also include adding an anti-Stokes material to one or more of the colour shifting ink compositions, wherein the anti-Stokes material is chosen to enable identification on the colour shifting ink composition and/or security document or device.

BRIEF DESCRIPTION OF THE DRAWINGS

In order that the present invention may be more readily understood, various embodiments thereof will now be described, by way of example only, with reference to the accompanying drawings, in which.

DETAILED DESCRIPTION OF THE DRAWINGS

Figure 1:
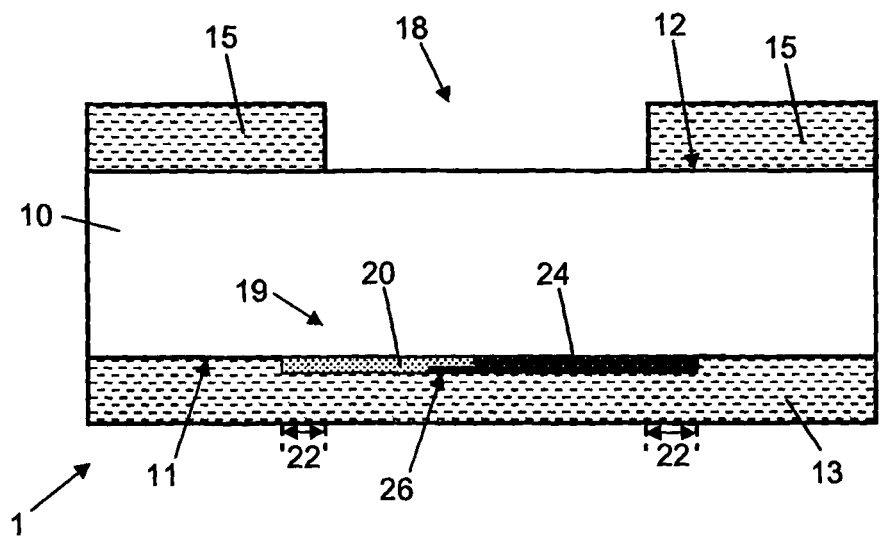
FIG. 1 is a sectional view through a part of a security document in accordance with one embodiment of the present invention.

Referring now to FIG. 1, there is shown a security document 1 comprising a sheet-like substrate 10 of clear plastics material having a first, lower surface 11 and a second, upper surface 12, an opacifying layer 13 applied on the first, lower surface 11 of the substrate 10, an opacifying layer 15 applied on the second, upper surface 12 of the substrate 10, and a security device 19, including a first colour shifting ink 20 and a second colour shifting ink 24 on the lower surface 11 of the substrate 10 in combination with a "half-window" 18.

As shown in FIG. 1, the opacifying layer 15 is not applied over the entire upper surface 12 of the substrate 10 and thus leaves an area of the second, upper surface 12 which is not covered by opacifying ink to form the "half-window" 18 on one side of the substrate substantially in the region of the security device 20 which is applied to the first, lower surface 11 of the substrate 10.

The substrate 10 of clear plastics material preferably is formed from a transparent polymeric material which may be made up of at least one bi-axially-oriented polymeric film. The substrate may comprise a single layer film of polymeric material. Alternatively, the substrate may comprise a laminate of two or more layers of transparent bi-axially-oriented polymeric film of the type described in Australian Patent No. AU-A-87665/82, the contents of which are incorporated herein by reference.

The opacifying layers 13 and 15 may comprise any one or more of a variety of opacifying inks which can be used in the printing of banknotes or other security documents. For example, layers of opacifying ink may comprise pigmented coatings comprising a pigment, such as titanium dioxide, dispersed within a binder or carrier of heat-activated cross-linkable polymeric material as described in Patent Specification No. AU-A-87665/82. Alternatively, the opacifying layers may comprise paper or other opaque or partially opaque material used in the construction of security documents, such as banknotes or the like.

The colour shifting ink composition includes a major proportion of an optically variable pearlescent interference pigment, such as KW Pearl Pigments produced by Kunwei Pearl Pigment Co Ltd, and a minor proportion of a colour pigment. The interference pigment and particles of the colour pigment are mixed with a transparent binder or resin to form the colour shifting ink composition which is suitable for application to a substrate in a printing process.

The colour shifting ink is preferably formed from a formulation including from about 10% to about 30% of a pearl lustre interference pigment (for example, interference pigments produced by the Kunwei Pearl Pigment Co. Ltd), from about 0.5% to about 10% of a colour pigment, which is preferably an organic colour pigment but may also be inorganic, eg phtalocynanine blue, and from about 60% to 90% of transparent binder or resin. Preferably, the pearl lustre interference pigments have a particle size from about 5 µm (microns) to about 200 µm (microns).

In addition, the colour shifting ink composition also, preferably, includes an up-converter material, which is also known as an anti-Stokes pigment or phosphor. An up-converter or anti-Stokes material, upon absorption of two or more photons and, therefore, entering an "excited" state, emits a photon of greater energy than the absorbed photons. So, for example, an anti-Stokes material may absorb light in the infra-red wavelength range and emit in the visible wavelength range. Anti-Stokes materials can be chosen for a particular colour shifting ink composition to be identifiable upon forensic examination of a security document. That is, a particular anti-Stokes material is chosen for a particular ink or security document, enabling positive identification of printing by a particular security printed of the particular ink or security document. In this manner, printing colour shifting ink compositions on a security document containing an anti-Stokes material provides a much improved security feature. The colour shifting ink compositions are chosen to have matching colours emitted by their respective interference pigments to create a highly effective visual security feature, whilst also having an anti-Stokes material which can only be detected when the printed colour shifting ink composition is irradiated under certain wavelengths of electromagnetic radiation. An anti-Stokes detection device is capable of distinguishing the amount and type of anti-Stokes material used and, therefore, is capable of verifying the anti-Stokes material by determining the unique signature emitted.

The colour shifting ink compositions 20 and 24 in the region of the half-window 18 exhibits a colour shifting effect when viewed in reflection from the upper side of the substrate. Both colour shifting ink compositions, despite having different interference pigments and colour pigments, exhibit a substantially similar first colour, which is a colour relating to the interference pigment and is of a pearlescent nature, at the same first viewing angle, or angles. The fact that the two different interference pigments in colour shifting ink compositions 20 and 24 exhibit a substantially similar colour at a particular viewing angle but a different colour at another angle is a phenomenon known as geometric metamerism. That is, where two inks, or other material exhibiting a particular colour, have a colour match when viewed from one angle, but then fail to match when viewed from a different angle When the document is tilted or rotated such that the viewing angle changes, a second colour, different from the first colour, is exhibited by the first colour shifting ink composition 20 and a third colour (different from the first and second colours) is exhibited by the second colour shifting ink compositions 24. When the colour shifting inks 20 and 24 in the half window area are viewed in transmission, no colour changing effects can be seen, though an image formed by the colour shifting inks 20, 24 is discernible as being different shades of colour to the surrounding area, the colours being shades of the colour pigment in each colour shifting ink (the colour pigment colours being modified by the opacifying layers 13, 15).

As shown in FIG. 1, the colour shifting inks 20, 24 extends partly into the area 22 surrounding the half-window 18. These parts 22 of the image exhibit no colour shifting effects whether viewed in reflection or transmission, due to the effect of the opacifying layers 13, 15, and, again, the colours viewable being shades of the colour pigment in each colour shifting ink.

Each colour shifting ink 20, 24 is printed in a printing operation. In the embodiment shown in FIG. 1, colour shifting ink 20 is printed first and colour shifting ink 24 is printed second before both inks are covered or printed over by the opacifying layer 13. In one embodiment, it is preferable to ensure that the colour shifting inks 20 and 24 have an overlap 26. This helps to reduce registration errors whilst also providing a further alternative colour or shade which can be incorporated in a design in the half-window 18. The further alternative colour is a combination of the colour pigments present in each colour shifting ink 20, 24 and can appear darker due to the combination of the colour pigments. When the overlap 26 is viewed from the first viewing angle through the half-window 18, the first colour, induced by the interference pigment, is viewable without modification.

Figure 2:
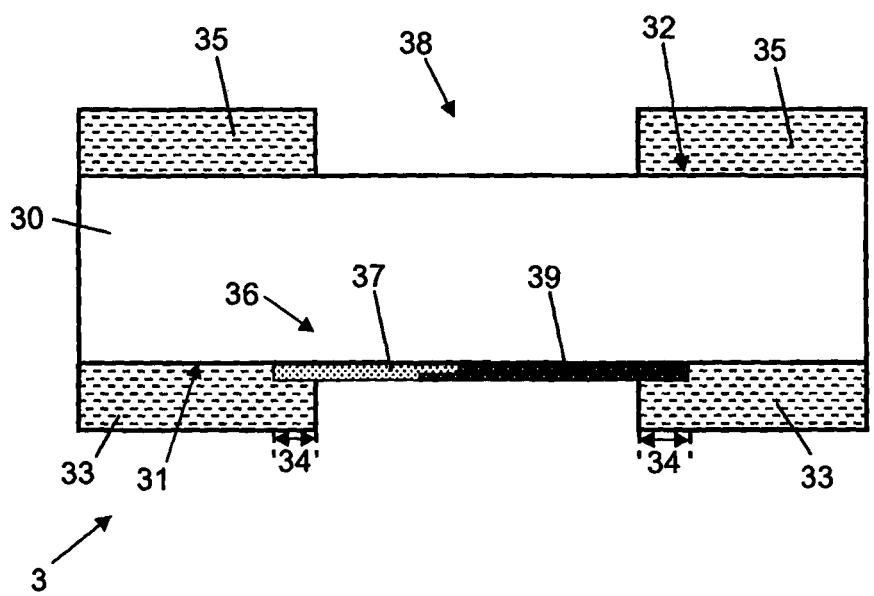
FIG. 2 is a sectional view through a part of a security document in accordance with another embodiment of the present invention.

FIG. 2 shows a security document 3 comprising a sheet-like substrate 30 of clear plastics material having a first, lower surface 31 and a second, upper surface 32, a layer 33 of opacifying ink applied on the first, lower surface 31 of the substrate 30, a layer of opacifying ink 35 applied on the second, upper surface 32 of the substrate 30, and a security device 36 including a colour shifting ink 37 and a second colour shifting ink 39 on the lower surface 31 of the substrate 30 in combination with a "window" 38.

As shown in FIG. 2, the opacifying layers of ink 33 and 35 are not applied over the entire surfaces 31 and 32 of the substrate 30 and thus leave an area of the surfaces 31 and 32 which is not covered by opacifying ink to form a "window" 38 on the substrate 30.

The substrate 30 is preferably formed by one of the same materials as the substrate 10 in FIG. 1. Similarly, the opacifying layer may be formed from one of the opacifying inks described above or by paper or other opaque or partially opaque material.

The colour shifting ink 37 and colour shifting ink 39, in the region of the transparent window 38, exhibits a colour shifting effect. At certain viewing angles, a first colour, the colour of the pearlescent interference pigment is seen from both the colour shifting ink 37 and colour shifting ink 39, and at other viewing angles distinct second and third colours, the colours of the colour pigments in each colour shifting ink, are seen. When the windows 38 is viewed from the side in which the colour shifting ink 37 and colour shifting ink 39 are printed, it is still possible to view the metameric interference pigments of the colour shifting ink 37 and colour shifting ink 39 at certain viewing angles, which substantially correspond to the first viewing angle, as mentioned above. In a similar manner, at other viewing angles, second and third colours are seen from the colour pigment of the colour shifting ink 37 and colour shifting ink 39, respectively.

As shown in FIG. 2, the colour shifting ink 37 and colour shifting ink 39 extends partly into the opaque areas 34 surrounding the transparent window 38. These parts 34 of the image formed by the colour shifting ink 37 and colour shifting ink 39 exhibit no colour shifting effects when viewed in reflection or transmission, but may appear a slightly different shade of the second and third colours of the colour shifting ink 37 and colour shifting ink 39. respectively, of the colour pigments in the window 38.

It should be noted that the colour pigment in each colour shifting ink composition has an effect on the colour of the interference pigment. Therefore, to achieve a colour match from the interference pigment in both the first and second colour shifting ink compositions, discussed above in relation to FIGS. 1 and 2, a particular interference pigment must be chosen with a particular colour pigment such that the resulting colour achieves a match at the first viewing angle in which the interference pigments are viewable. For example, the first colour shifting ink composition is made from a green interference pigment and a brown colour pigment, which results in the interference pigment providing a more yellow shade. The second colour shifting ink composition is made from a gold interference pigment and an transparent green pigment, changing the interference pigment to a greener gold. The proportions of colour pigment in the first and second colour shifting ink composition are selected to achieve a substantially identical colour when combined with the particular interference pigment at the first viewing angle and different colours at other angles and in transmission.

It should also be noted that the same interference pigment cannot be used to achieve a similar colour at the angle in which the interference pigments are viewable due to effect of the colour pigment on the colour of the interference pigment. That is, a particular interference pigment must be selected with a particular colour and concentration of colour pigment to enable the match first and second colour shifting ink compositions to match when the interference pigments are viewable.

Figure 3:
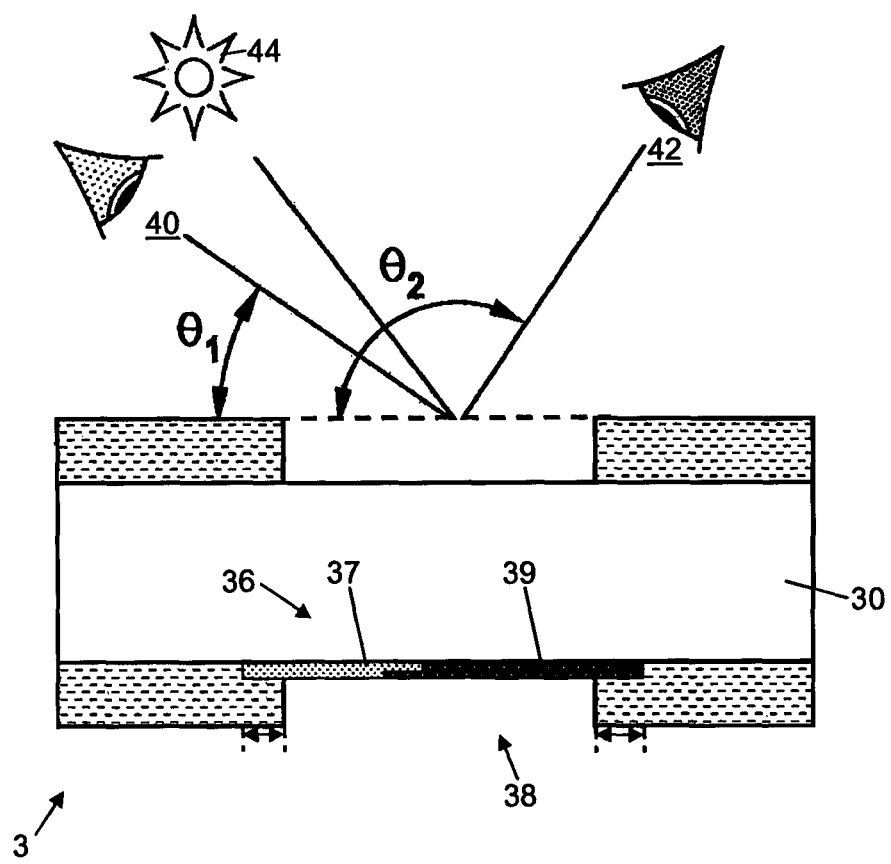
FIG. 3 is a schematic diagrams showing colour depending upon the viewing angle.

FIG. 3 is a schematic diagram showing the colour shift between a first viewing angle 40 and a second viewing angle 42 with the angle varying from $\theta_1$ to $\theta_2$ in the presence of a light source 44. A security document 3 is shown, as previously described in relation to FIG. 2. When the security device 36 is viewed from the angle $\theta_1$ the viewer sees a first colour, e.g. pearlescent green, which is exhibited by both the colour shifting ink 37 and colour shifting ink 39. Upon rotating the security document through the angle $\theta_2$ the viewer sees a second colour, e.g. green, from the first colour shifting ink 37 and a third colour, e.g. brown, from the second colour shifting ink 39. Although the first viewing angle 40 is given as $\theta_1$ in this example, there may be further angles at which the first colour may be exhibited by the first colour shifting ink 37 and second colour shifting ink 39. The angles at which the first colour is viewable, that is the colour corresponding to the interference pigments, are of a narrow range and are, typically, in a range of around 1° to 5°. The angles in which the second and third colours are viewable are much larger and are generally in a range of around 30° to 40°.

Figure 4A:
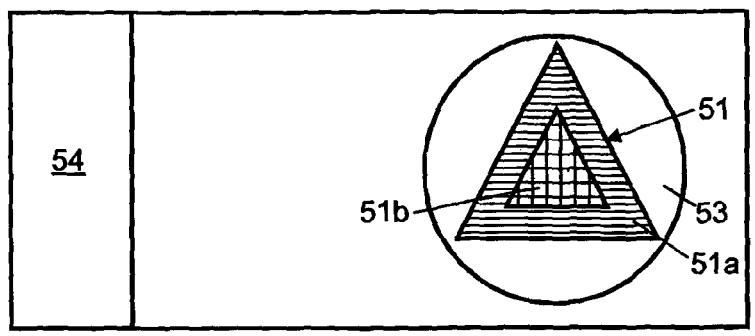
FIG. 4*a* is a view of a security document from a first angle.
Figure 4B:
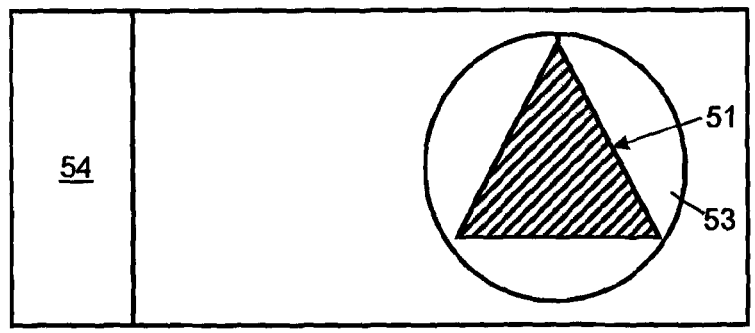
FIG. 4*b* is a view of the security document in FIG. 4*a* from a second angle.

FIGS. 4a and 4b show another embodiment of the present invention in which a security document 50 includes a composite security device or image 51 in the area of a window or half-window 53. The composite device or image 51 is formed in two parts, 51a and 51b formed from first and second colour shifting inks. When the device or image 51 is viewed from a first angle, corresponding to the angle at which the interference pigments of the first and second colour shifting inks exhibit a substantially identical first colour, the two parts of the device 51a and 51b, appear as substantially the same colour, as shown in FIG. 4b. However, when the security document is rotated, in the manner described with reference to FIG. 3 the device or image 51 exhibits second and third colours, corresponding to the colour pigments of the first and second colour shifting inks, as shown in FIG. 4a.

Figure 5A:
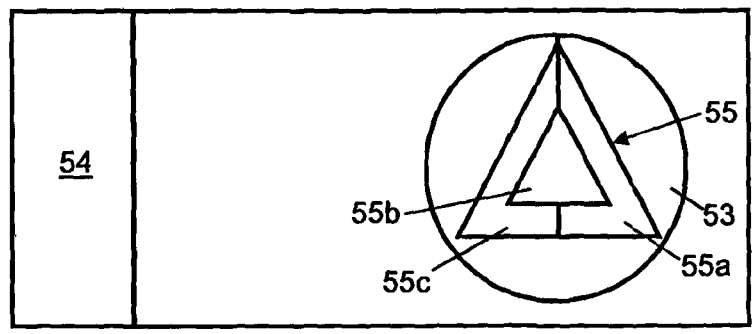
FIG. 5*a* is a schematic view of a security document to show colour shifting ink composition placement
Figure 5B:
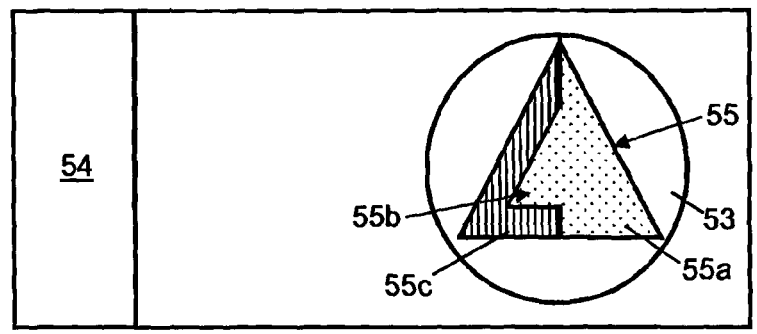
FIG. 5*b* is a view of a security document in FIG. 5*a* from a first angle.
Figure 5C:
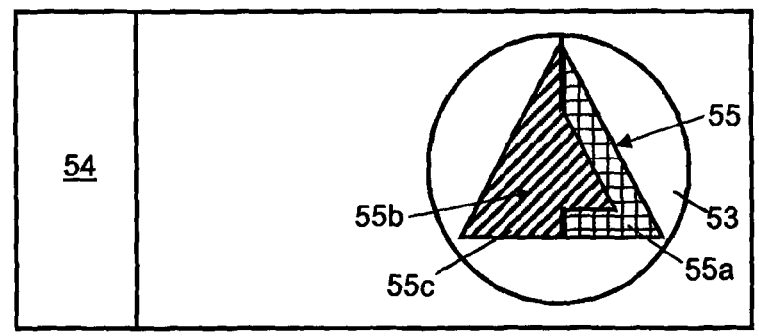
FIG. 5*c* is a view of the security document in FIG. 5*a* from a second angle.

FIGS. 5a, 5b and 5c shows another security document 50 with a security device 55 including sub-regions 55a, 55b and 55c printed with different colour shifting ink compositions. In this example, sub-regions 55a and 55b are printed with a first colour shifting ink composition and a second colour shifting ink composition, respectively, which have interference pigments which exhibit a substantially similar first colour at a first viewing angle or angles, as shown in FIG. 5b. At other viewing angles, sub-regions 55a and 55b exhibit a second and third colour, which are caused by the colour pigments of the first and second colour shifting ink composition, as shown in FIG. 5c. Sub-region 55c, in this example, includes a third colour shifting ink composition including a colour pigment and an interference pigment, as described above. Sub-region 55c, when viewed at the first viewing angle or angles exhibits a fourth colour, as shown in FIG. 5b, caused by the interference pigment, and which is different to the first colour. In this manner, and using other colour shifting ink compositions, an image may be created that can be viewed at the first viewing angle. In sub-region 55c at the second viewing angle(s), the third colour is viewable, as shown in FIG. 5c, that is the same or substantially the same colour as exhibited by the second colour shifting ink's colour pigment, which is exhibited by the colour pigment of the third colour shifting ink.

In this manner, by selective printing of colour shifting ink compositions whose colours match either at the first angles, or angles, due to the effect of the interference pigment, or the second angles, or angles, due to the colour pigment, an image created in colour shifting inks can change depending on the particular angle of viewing. This effect is advantageous as it provides a visually pleasing effect to the viewer whilst also being very difficult to replicate.

Particular reference is made to prior art patent application WO2006/133512 by the same applicant. WO2006/133512 describes colour shifting inks which exhibit substantially the same colours at one angle or angles and different colours at another angles or angles. However, WO2006/133512 teaches the matching of colour pigments and fails to disclose or suggest the matching of interference pigments. Matching interference pigments provides a greater level of security because of the difficulty in reproducing colour shifting inks which will have interference pigments that match. Colour pigments do not necessarily provide a strong level of security because they are relatively easy to produce. Adding an interference pigment to a colour pigment produces a colour shifting effect as described in WO2006/133512. However, producing two colour shifting inks which utilise different colour pigments and interference pigments but produce similar colours from the interference pigments is particularly difficult for the counterfeiter, due to the selection of appropriate pigments.

The security device or document as described herein has a distinct advantage over other colour matching security elements because the first and second colour shifting ink compositions can be printed on to a security device or document removing the need for complicated or costly process such as creating specific interference filters, diffraction gratings or other layered colour shifting effects.

In the colour shifting ink compositions according to the invention, the selection of appropriate interference pigments and colour pigments are made on a selection and testing basis. That is, potentially suitable interference pigments and colour pigments are chosen, combined and printed to establish the match of interference pigment colours and colour pigment colours.

The security document 50 may also include self-verifying means, in the form of at least one substantially plain area 54, for verifying the security document. The document may be verified by being bent or folded such that the device 51 is brought into register with the area 54. In this position, the device 51 appears to be the first distinct colour.

It will be appreciated that various modifications may be made to the security documents and methods described above without departing from the scope and spirit of the present invention. For example, it is possible for the security document or device to include both full window areas and half-window areas, as well as surrounding or adjacent opaque areas with the colour shifting ink overlapping the window, the half-window and opaque areas, so that different colour shifting effects can be viewed in the different areas. It is also possible in some embodiments for the window or half-window area to be provided in a security document formed primarily from a paper or fibrous substrate, with the window or half-window area consisting of transparent plastics material inserted into an opening in the paper or fibrous substrate.

In a further modification (not shown) a composite image may be printed in two or more colour shifting inks in a series of dots, rather than solid areas. This enables parts of a composite image exhibiting different colour shifting effects to be intertwined in some parts of the image and separate in other parts of the image.

It should also be appreciated that although the description refers particularly to two (first and second) colour shifting ink compositions, it is quite possible that there are further colour shifting ink compositions and that other colour shifting ink compositions present in the security document or device can have a common matching colour for their particular interference pigments in addition to the matching colour of the first and second, or that there is a third colour shifting ink composition, as described in relation to FIG. 5, or further colour shifting ink compositions, which have a common matching colour for their particular interference pigments. That is, the invention is not limited to only two or three colour shifting ink compositions having a geometric metamerism in relation to their interference pigments.

The invention claimed is:

1. A security document or device including at least one area formed from a transparent plastics material which is exposed on at least one side to form a window or half-window, and a first colour shifting ink composition including a first interference pigment and a first colour pigment and a second colour shifting ink composition including a second interference pigment and a second colour pigment, applied in at least part of the window or half-window, wherein the first colour shifting ink composition provides, at a first viewing angle, a first colour from the first interference pigment and the second colour shifting ink composition provides, at the first viewing angle, substantially the same first colour from the second interference pigment, wherein, at a second viewing angle, different from the first viewing angle, the first colour shifting ink composition provides a second colour from the first colour pigment and the second colour shifting ink composition provides a third colour from the second colour pigment, different from the first and second colour, wherein the first and second interference pigment are different than one another and the first and second organic colour pigments are different than one another.

2. A security document or device as claimed in claim 1 including a transparent plastics substrate, and at least one opacifying coating applied to a surface on at least one side of the substrate in such a manner as to leave a region of the substrate uncovered to form the window or half-window.

3. A security document or device as claimed in claim 1 including a third colour shifting ink composition, wherein the third colour shifting ink composition has an interference pigment which provides a fourth colour at the first viewing angle, different to the first colour provided by the first and second colour shifting ink composition, and a colour pigment which provides the second or third colour at the second viewing angle, as provided by the first or second colour shifting ink composition.

4. A security document or device as claimed in claim 1, wherein at least one of the first, second or third colour shifting ink compositions includes an anti-stokes material, wherein the anti-stokes material is chosen to enable identification on the colour shifting ink composition and/or security document or device.

5. A security document including a security device as claimed in claim 1, wherein the security document is one of the following: an item of currency such as a banknote or coin, a credit card, a cheque, a passport, an identity card, a security or share certificate, a driver's licence, a deed of title, a travel document, such as an airline or train ticket, an entrance card or ticket, a birth, death or marriage certificate, and an academic transcript.

6. A method of producing a security document or device which includes the steps of:
providing a sheet-like substrate of transparent plastics material having first and second surfaces on opposite sides of the substrate;
applying at least one opacifying coating on said first surface of the substrate in such a manner as to leave a region of the substrate uncovered to form a window;

applying a first colour shifting ink composition including a first colour pigment and a first interference pigment in at least part of the window region of the substrate; and applying a second colour shifting ink composition including a second colour pigment and a second interference pigment in at least part of the window region of the substrate, wherein the first colour shifting ink composition provides, at a first viewing angle, a first colour from the first interference pigment and the second colour shifting ink composition provides, at the first viewing angle, substantially the same first colour from the second interference pigment, wherein at a second viewing angle, different from the first viewing angle, the first colour shifting ink composition provides a second colour from the first colour pigment and the second colour shifting ink composition provides a third colour from the second colour pigment, different from the first and second colour, wherein the first and second interference pigment are different than one another and the first and second organic colour pigments are different than one another.

7. A method as claimed in claim 6, including applying a third colour shifting ink composition having a third interference pigment which provides a fourth colour at the first viewing angle, different to the first colour provided by the first and second colour shifting ink composition, and a colour pigment which provides the second or third colour at the second viewing angle, as provided by the first or second colour shifting ink composition.

8. A method as claimed in claim 6, including adding an anti-stokes material to at least one of the first, second or third colour shifting ink compositions includes, wherein the anti-stokes material is chosen to enable identification on the colour shifting ink composition and/or security document or device.

9. A security document or device including at least one area formed from a transparent plastics material which is exposed on at least one side to form a window or half-window, and a first colour shifting ink composition including a first interference pigment and a first organic colour pigment and a second colour shifting ink composition including a second interference pigment and a second organic colour pigment, applied in at least part of the window or half-window, wherein the first colour shifting ink composition provides, at a first viewing angle, a first colour from the first interference pigment and the second colour shifting ink composition provides, at the first viewing angle, substantially the same first colour from the second interference pigment, wherein, at a second viewing angle, different from the first viewing angle, the first colour shifting ink composition provides a second colour from the first organic colour pigment and the second colour shifting ink composition provides a third colour from the second organic colour pigment, different from the first and second colour, wherein the first and second interference pigment are different than one another and the first and second organic colour pigments are different than one another.

\* \* \* \* \*